(12) United States Patent
    Yin

(10) Patent No.: US 11,247,134 B2
(45) Date of Patent: Feb. 15, 2022

(54) MESSAGE PUSH METHOD AND APPARATUS, DEVICE, AND STORAGE MEDIUM

(71) Applicant: TENCENT TECHNOLOGY (SHENZHEN) COMPANY LIMITED, Shenzhen (CN)

(72) Inventor: Ming Yin, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 54 days.

(21) Appl. No.: 16/887,831

(22) Filed: May 29, 2020

(65) Prior Publication Data
    US 2020/0289947 A1    Sep. 17, 2020

Related U.S. Application Data

(63) Continuation of application No. PCT/CN2019/073901, filed on Jan. 30, 2019.

(30) Foreign Application Priority Data

Feb. 27, 2018   (CN) .......................... 201810161603.8

(51) Int. Cl.
    *A63F 13/87*    (2014.01)
    *A63F 13/537*   (2014.01)
    (Continued)

(52) U.S. Cl.
    CPC ............ *A63F 13/87* (2014.09); *A63F 13/537* (2014.09); *H04L 51/04* (2013.01); *H04N 21/233* (2013.01);
    (Continued)

(58) Field of Classification Search
    CPC ........ A63F 13/87; A63F 13/537; H04L 51/04; H04L 51/10; H04L 51/046; H04L 51/20;
    (Continued)

(56) References Cited

U.S. PATENT DOCUMENTS

2001/0001160 A1*  5/2001  Shoff ................. H04N 5/44543
                                                    725/51
2009/0094330 A1*  4/2009  McQuaide, Jr ...... H04N 21/254
                                                    709/205
(Continued)

FOREIGN PATENT DOCUMENTS

| CN | 103517101 A | 1/2014 |
| CN | 104284248 A | 1/2015 |
| CN | 106998486 A | 8/2017 |

OTHER PUBLICATIONS

International Search Report Issued in Application No. PCT/CN2019/073901 dated Apr. 28, 2019, with English Translation (5 pages).
(Continued)

*Primary Examiner* — Fernando Alcon
(74) *Attorney, Agent, or Firm* — Oblon, McClelland, Maier & Neustadt, L.L.P.

(57) ABSTRACT

A message push method includes playing a first video in a play interface of a terminal according to first video data transmitted by a server. The method further includes displaying, by processing circuitry of the terminal, a scenario interaction interface at a preset playback time of the first video, the scenario interaction interface being set according to display content of an electronic device shown in the first video. Next, the method includes obtaining interaction information input based on the displayed scenario interaction interface, and obtaining a target message related to the obtained interaction information. Finally, the method
(Continued)

includes outputting the obtained target message by the processing circuitry of the terminal.

20 Claims, 12 Drawing Sheets

(51) Int. Cl.
```
H04L 12/58      (2006.01)
H04N 21/233     (2011.01)
H04N 21/2668    (2011.01)
H04N 21/466     (2011.01)
H04N 21/478     (2011.01)
H04N 21/4788    (2011.01)
H04N 21/488     (2011.01)
```
(52) U.S. Cl.
CPC ..... *H04N 21/2668* (2013.01); *H04N 21/4666* (2013.01); *H04N 21/4781* (2013.01); *H04N 21/4788* (2013.01); *H04N 21/4882* (2013.01)

(58) Field of Classification Search
CPC ............ H04N 21/233; H04N 21/2668; H04N 21/4666; H04N 21/4781; H04N 21/4788; H04N 21/4882; H04N 21/475; H04N 21/8545; H04N 21/4758; H04N 1/47202; H04N 21/440236; H04N 21/234336
See application file for complete search history.

(56) References Cited

U.S. PATENT DOCUMENTS

| | | | |
|---|---|---|---|
| 2013/0260896 A1* | 10/2013 | Miura ................... | A63F 13/795 463/42 |
| 2013/0289998 A1* | 10/2013 | Eller ....................... | G10L 13/08 704/260 |
| 2015/0286937 A1* | 10/2015 | Hildebrand .......... | H04L 12/1859 706/11 |
| 2015/0310446 A1* | 10/2015 | Tuchman ............. | G06Q 30/016 705/304 |
| 2015/0382047 A1* | 12/2015 | Van Os ................... | G10L 17/22 725/38 |
| 2018/0033042 A1* | 2/2018 | Wang ................. | G06Q 30/0601 |
| 2018/0068365 A1* | 3/2018 | Purves .................... | H04L 51/02 |
| 2018/0188916 A1* | 7/2018 | Lyons .............. | H04N 21/23418 |
| 2018/0232741 A1* | 8/2018 | Jadhav ................. | G06Q 30/016 |
| 2018/0285413 A1* | 10/2018 | Vora ....................... | G06N 5/041 |
| 2019/0012390 A1* | 1/2019 | Nishant ................ | G06F 16/248 |

OTHER PUBLICATIONS

Written Opinion Issued in Application No. PCT/CN2019/073901 dated Apr. 28, 2019 (3 pages).

* cited by examiner

MESSAGE PUSH METHOD AND APPARATUS, DEVICE, AND STORAGE MEDIUM

RELATED APPLICATION

This application is a continuation of International Patent Application No. PCT/CN2019/073901, filed on Jan. 30, 2019, which claims priority to Chinese Patent Application No. 201810161603.8, filed on Feb. 27, 2018 and entitled "MESSAGE PUSH METHOD AND APPARATUS, AND DEVICE." The entire disclosures of the prior applications are hereby incorporated by reference in their entirety.

FIELD OF THE TECHNOLOGY

Embodiments of this application relate to the field of computer and Internet technologies, and in particular, to a message push method and apparatus, a device, and a storage medium.

BACKGROUND OF THE DISCLOSURE

With development of science and technology, people may watch videos online by using various terminals. For example, users may watch videos by using video playback software in a mobile phone or watch videos by using a browser in a personal computer (PC).

In the related art, the terminal may push an advertisement message during video playback. Generally, the terminal directly pushes the advertisement message to a user. For example, an advertisement video is played before a video is started to be played. Alternatively, an advertisement popup window is displayed during video playback.

In the method of directly pushing the advertisement message during video playback in the related art, a correlation between the pushed advertisement message and content of the currently played video is relatively low, and therefore the probability that the user will watch the advertisement message is relatively low. As a result, the probability that the advertisement message is adopted is also relatively low.

SUMMARY

Embodiments of this application provide a message push method and apparatus, a device, and a storage medium, which may be used for resolving a problem that the probability of a user watching an advertisement message is relatively low because a correlation between the pushed advertisement message and video content is relatively low, and therefore the probability of the advertisement message being adopted is also relatively low. The technical solutions are as follows:

In an embodiment, a message push method includes playing a first video in a play interface of a terminal according to first video data transmitted by a server, and displaying, by processing circuitry of the terminal, a scenario interaction interface at a preset playback time of the first video, the scenario interaction interface being set according to display content of an electronic device shown in the first video. The method further includes obtaining interaction information input based on the displayed scenario interaction interface, obtaining a target message related to the obtained interaction information, and outputting the obtained target message by the processing circuitry of the terminal.

In an embodiment, the obtaining the target message includes transmitting the obtained interaction information to the server, and receiving the target message transmitted by the server, the target message being obtained by the server according to the obtained interaction information.

In an embodiment, the method further includes, after the outputting, switching from the scenario interaction interface to the play interface, and playing a second video in the play interface according to second video data, video content of the second video comprising reward content related to video content of the first video.

In an embodiment, the method further includes, before the playing the second video, transmitting a video request to the server, the video request requesting the server to transmit the second video data, and receiving the second video data transmitted by the server.

In an embodiment, the display content of the electronic device shown in the first video comprises instant messaging content, and the scenario interaction interface is an instant messaging interface set according to the instant messaging content. The obtaining the interaction information input based on the scenario interaction interface includes obtaining text information inputted in the instant messaging interface, or obtaining audio information captured by the terminal based on the instant messaging interface.

In an embodiment, the outputting includes displaying a text message of the target message in the instant messaging interface, the text message of the target message being generated by an artificial intelligence model, and the artificial intelligence model being obtained by training a neural network model by using at least one of a preset text sample or a preset audio sample, or playing an audio message of the target message based on the instant messaging interface, the audio message of the target message being generated by an artificial intelligence model, and the artificial intelligence model being obtained by training a neural network model by using at least one of a preset text sample or a preset audio sample.

In an embodiment, the display content of the electronic device shown in the first video includes call content, and the scenario interaction interface is a call interface set according to the call content. The obtaining the interaction information input based on the scenario interaction interface includes obtaining a trigger signal on an answer control in the call interface, or obtaining audio information captured by the terminal based on the call interface.

In an embodiment, the outputting includes playing an audio message of the target message based on the call interface, the audio message of the target message being a preset audio message or the audio message of the target message being generated by an artificial intelligence model, and the artificial intelligence model being obtained by training a neural network model by using at least one of a preset text sample or a preset audio sample.

In an embodiment, the display content of the electronic device shown in the first video comprises game content, and the scenario interaction interface is a game demo interface set according to the game content. The method further includes obtaining an operation signal in the game demo interface, and playing a third video in the game demo interface according to the operation signal, the third video being a video set according to the game content.

In an embodiment, the display content of the electronic device shown in the first video comprises game content, and the scenario interaction interface is a game interface set according to the game content. The method further includes obtaining a control instruction in the game interface, and performing a corresponding game operation in the game interface according to the control instruction.

In an embodiment, the method further includes, before the displaying the scenario interaction interface, displaying a prompt interface together with the play interface at the preset playback time of the first video, the prompt interface requesting to switch to the scenario interaction interface, and displaying the scenario interaction interface in a case that a switching signal is obtained through the prompt interface.

In an embodiment, the audio message of the target message corresponding to a character shown in the first video.

In an embodiment, a message push terminal includes processing circuitry configured to play a first video in a play interface according to first video data transmitted by a server, and display a scenario interaction interface at a preset playback time of the first video, the scenario interaction interface being set according to display content of an electronic device shown in the first video. The processing circuitry is also configured to obtain interaction information input based on the displayed scenario interaction interface, obtain a target message related to the obtained interaction information, output the obtained target message.

In an embodiment, to obtain the target message, the processing circuitry is configured to transmit the obtained interaction information to the server, and receive the target message transmitted by the server, the target message being obtained by the server according to the obtained interaction information.

In an embodiment, the processing circuitry is further configured to, after the outputting, switch from the scenario interaction interface to the play interface, and play a second video in the play interface according to second video data, video content of the second video comprising reward content related to video content of the first video.

In an embodiment, the processing circuitry is further configured to, before the playing the second video, transmit a video request to the server, the video request requesting the server to transmit the second video data, and receive the second video data transmitted by the server.

In an embodiment, the display content of the electronic device shown in the first video comprises instant messaging content, and the scenario interaction interface is an instant messaging interface set according to the instant messaging content. To obtain the interaction information input based on the scenario interaction interface, the processing circuitry is configured to obtain text information inputted in the instant messaging interface, or obtain audio information captured by the terminal based on the instant messaging interface.

In an embodiment, to perform the outputting, the processing circuitry is configured to display a text message of the target message in the instant messaging interface, the text message of the target message being generated by an artificial intelligence model, and the artificial intelligence model being obtained by training a neural network model by using at least one of a preset text sample or a preset audio sample, or play an audio message of the target message based on the instant messaging interface, the audio message of the target message being generated by an artificial intelligence model, and the artificial intelligence model being obtained by training a neural network model by using at least one of a preset text sample or a preset audio sample.

In an embodiment, the display content of the electronic device shown in the first video comprises call content, and the scenario interaction interface is a call interface set according to the call content. To obtain the interaction information input based on the scenario interaction interface, the processing circuitry is configured to obtain a trigger signal on an answer control in the call interface, or obtain audio information captured by the terminal based on the call interface.

In an embodiment, a non-transitory computer-readable storage medium, storing instructions, which, when executed by at least one processor of a terminal, cause the terminal to perform a message push method, including playing a first video in a play interface of a terminal according to first video data transmitted by a server. The method further includes displaying, by processing circuitry of the terminal, a scenario interaction interface at a preset playback time of the first video, the scenario interaction interface being set according to display content of an electronic device shown in the first video. Finally, the method includes obtaining interaction information input based on the displayed scenario interaction interface, obtaining a target message related to the obtained interaction information, and outputting the obtained target message by the processing circuitry of the terminal.

The technical solutions provided in the embodiments of this application may achieve the following beneficial effects:

During playback of the first video, the terminal obtains, according to the interaction information of interaction performed based on the scenario interaction interface, the target message to be pushed, and pushes the target message based on the scenario interaction interface. The scenario interaction interface is set according to the display content of the electronic device in the first video, and has a relatively high correlation with the video content of the first video. Therefore, a user may be attracted, so that a probability of the user watching or listening to the target message is relatively high when the target message is pushed based on the scenario interaction interface, thereby increasing a probability that the user adopts the target message.

BRIEF DESCRIPTION OF THE DRAWINGS

To describe the technical solutions of the embodiments of this application more clearly, the following briefly introduces the accompanying drawings required for describing the embodiments. The accompanying drawings in the following description show only some embodiments of this application, and a person of ordinary skill in the art may still derive other drawings from these accompanying drawings.

DESCRIPTION OF EMBODIMENTS

To make objectives, technical solutions, and advantages of this application clearer, the following further describes in detail implementations of this application with reference to the accompanying drawings.

Figure 1:
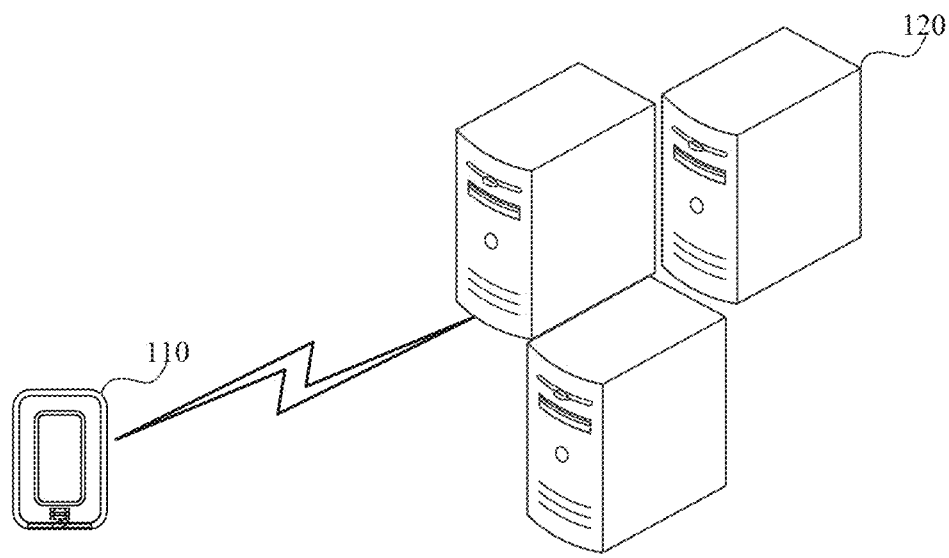
FIG. 1 is a schematic diagram of an implementation environment according to an embodiment of this application.

FIG. 1 is a schematic diagram of an implementation environment according to an embodiment of this application. The implementation environment includes a terminal 110 and a server 120.

The terminal 110 may be an electronic device such as a mobile phone, a tablet computer, a multimedia playback device, or a PC. Optionally, a client on which video playback software is run is installed in the terminal 110. The video playback software has a video playback function. The terminal 110 establishes a communications connection to the server 120 by using a wired network or a wireless network. Optionally, data exchange is performed between the terminal 110 and the server 120 through a content delivery network (CDN).

The server 120 may be one server, a server cluster including a plurality of servers, or a cloud computing service center. The server 120 may be a background server configured to provide background services for the client.

Figure 2:
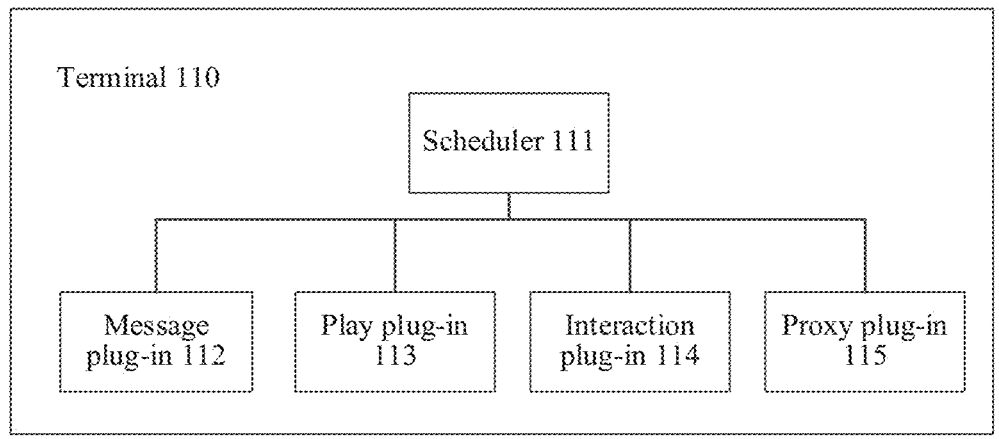
FIG. 2 is an architectural diagram of a terminal according to an embodiment of this application.

Optionally, as shown in FIG. 2, the terminal 110 includes a scheduler 111, a message plug-in 112, a play plug-in 113, an interaction plug-in 114, and a proxy plug-in 115. The message plug-in 112, the play plug-in 113, the interaction plug-in 114, and the proxy plug-in 115 are independent from each other.

The scheduler 111 is configured to manage video playback and message push (message outputting) during video playback. The message plug-in 112 is configured to manage and store a to-be-pushed message. The play plug-in 113 is configured to play a video. The interaction plug-in 114 is configured to interact with a user, and receive interaction information from the user. The proxy plug-in 115 is configured to interact with the server 120.

Figure 3:
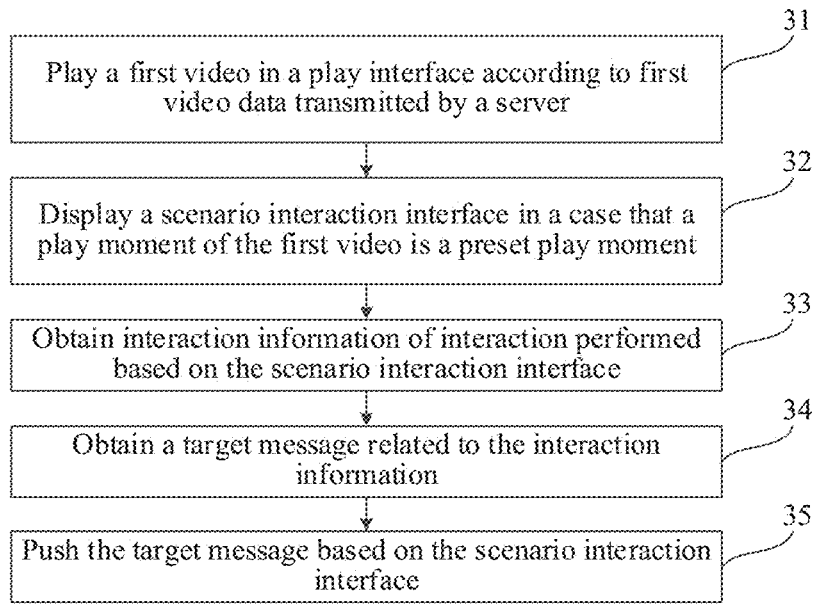
FIG. 3 is a flowchart of a message push method according to an embodiment of this application.

FIG. 3 is a flowchart of a message push method according to an embodiment of this application. The method may be applied to the terminal 110 in the implementation environment shown in FIG. 1. The method may include the following steps, in step 31, a first video is played in a play interface according to first video data transmitted by a server. For example, a first video is played in a play interface of a terminal according to first video data transmitted by a server.

Before playing the first video, the terminal needs to obtain the first video data of the first video from the server. The terminal transmits a video identifier of the first video to the server. One video identifier is used for uniquely identifying one video. The server stores video data and video data of different videos is distinguished and stored according to video identifiers. The server transmits the first video data of the first video to the terminal according to the video identifier of the first video. After receiving the first video data transmitted by the server, the terminal loads the first video data, and plays the first video in the play interface.

The first video is a video selected and played by a user. For example, the terminal displays a video list, and a user selects the first video through a click/tap operation. When the user clicks/taps the first video in the video list, the click/tap operation triggers a selection signal corresponding to the first video. When obtaining the selection signal corresponding to the first video in the video list, the terminal obtains the identifier of the first video.

In step 32, a scenario interaction interface is displayed in a case that a play moment of the first video is a preset play moment. For example, a scenario interaction interface is displayed, by processing circuitry of the terminal, at a preset playback time of the first video, the scenario interaction interface being set according to display content of an electronic device shown in the first video.

During playback of the first video, the terminal obtains the current playback time of the first video. The terminal may obtain the current playback time of the first video in real time, or may obtain the current playback time of the first video at preset time intervals. The preset time interval may be set according to system requirements. For example, the current playback tune of the first video is obtained every three seconds. A manner in which the terminal obtains the current playback time of the first video is not specifically limited in this embodiment of the disclosure.

When the terminal detects that the current playback time of the first video is the preset playback time, the terminal displays the scenario interaction interface. The scenario interaction interface is set according to display content of an electronic device shown in the first video. The electronic device in the first video is an electronic device displayed in video content of the first video. The electronic device may be a device such as a mobile phone, a tablet computer, an e-book reader, a multimedia playback device, a wearable device, a PC, or a television. The type of electronic device is not limited in this embodiment of the disclosure.

In an embodiment, content included in the scenario interaction interface is the display content of the electronic device shown in the first video. That is, the scenario interaction interface is the same as a display interface of the electronic device shown in the first video. For example, if the display content of the electronic device in the first video is a chat session interface of an instant messaging application, the scenario interaction interface may be the chat session interface. For another example, if the display content of the electronic device in the first video is a game interface of a game application, the scenario interaction interface may be the game interface.

In another embodiment, the content included in the scenario interaction interface is content obtained after the display content of the electronic device shown in the first video is processed. That is, the scenario interaction interface is different from the display interface of the electronic device shown in the first video. The content included in the scenario interaction interface is content obtained after the display content in the display interface of the electronic device is processed. In this embodiment of the disclosure, a specific operation performed in the foregoing processing is not limited. For example, the scenario interaction interface may be obtained after related content is added, modified, deleted, or extracted in the display interface of the electronic device.

Optionally, the scenario interaction interface is set according to the display content of the electronic device displayed in the video content of the first video at the preset playback time. For example, a mobile phone is displayed in the video content of the first video at the preset playback time, and an incoming call answering interface is displayed on a screen of the mobile phone. In this case, the scenario interaction interface may be the incoming call answering interface.

In addition, the scenario interaction interface may include several operational controls, for example, operational controls such as a button, a slider, a joystick, and an input box. A user may interact with the terminal in the scenario interaction interface. The scenario interaction interface is set according to the display content of the electronic device shown in the first video. Therefore, the scenario interaction interface simulates a scenario in the video content, so that the user can interact in a scenario that is the same as that in the video content, thereby improving user immersion and attracting the user to interact.

In step 33, interaction information of interaction performed based on the scenario interaction interface is obtained. For example, interaction information input based on the displayed scenario interaction interface is obtained.

The interaction information is information inputted by the user in the scenario interaction interface in a human-computer interaction manner, or information generated through another human-computer interaction operation. Optionally, the interaction information includes, but is not limited to, at least one type of the following information: text information, audio information, picture information, video information, a touch operation signal, and the like.

In step 34, a target message related to the interaction information is obtained. For example, a target message related to the obtained interaction information is obtained.

After obtaining the interaction information, the terminal obtains the target message to be pushed (output) to the user. Optionally, the target message is an advertisement message. In this embodiment of the disclosure, a type of the advertisement message is not limited, and the advertisement message includes, but is not limited to, at least one of the following types: text, audio, a picture, a video, a web page, a program, and the like.

In step 35, the target message is pushed based on the scenario interaction interface. For example, the obtained target message is output by the processing circuitry of the terminal.

For different types of target messages, the terminal may push the target messages in different manners. For example, when the type of the target message is text, a picture, a video, or a web page, the terminal may display the target message. For example, the terminal may display the target message in the scenario interaction interface. For another example, if the type of the target message is audio, the terminal may play the audio. For still another example, if the type of the target message is a program, the terminal may run the program.

In this embodiment of the disclosure, during playback of the first video, the terminal obtains, according to the interaction information of the interaction performed based on the scenario interaction interface, the target message to be pushed, and pushes the target message based on the scenario interaction interface. The scenario interaction interface is set according to the display content of the electronic device shown in the first video and has a relatively high correlation with the video content of the first video. Therefore, a user may be attracted, so that a probability of the user watching or listening to the target message is relatively high when the target message is pushed based on the scenario interaction interface, thereby increasing a probability that the user adopts the target message.

Figure 4:
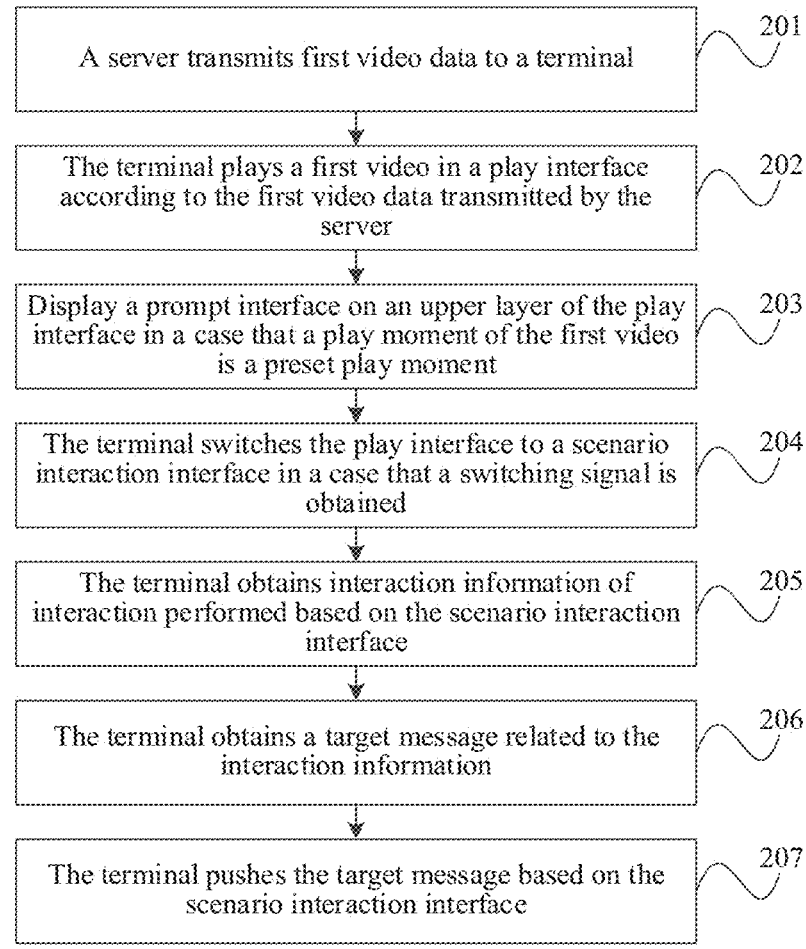
FIG. 4 is a flowchart of a message push method according to another embodiment of this application.

FIG. 4 is a flowchart of a message push method according to another embodiment of the disclosure. The method may be applied to the implementation environment shown in FIG. 1, The method may include the following steps. In step 201, first video data is transmitted by a server to a terminal. For example, a first video is transmitted by a server to a terminal.

In step 202, a first video is played by the terminal in a play interface according to the first video data transmitted by the server. For example, the first video received from the server is played by the terminal in a play interface.

In step 203, a prompt interface is displayed on an upper layer of the play interface in a case that a play moment of the first video is a preset play moment. For example, a prompt interface is displayed, by processing circuitry of the terminal, together with the play interface at a preset playback time of the first video, the prompt interface requesting to switch to a scenario interaction interface, and the scenario interaction interface being set according to video content shown in the first video at the preset playback time.

When it is detected that the current playback time of the first video is the preset playback time, the terminal displays the prompt interface. For example, the terminal displays the prompt interface on the upper layer of the play interface. In an embodiment, the terminal displays the prompt interface superimposed on the play interface or near the play interface. The prompt interface is used for prompting a user whether to switch to a scenario interaction interface. The user may choose to switch to the scenario interaction interface, or continue to play the first video instead of switching to the scenario interaction interface.

Figure 5:
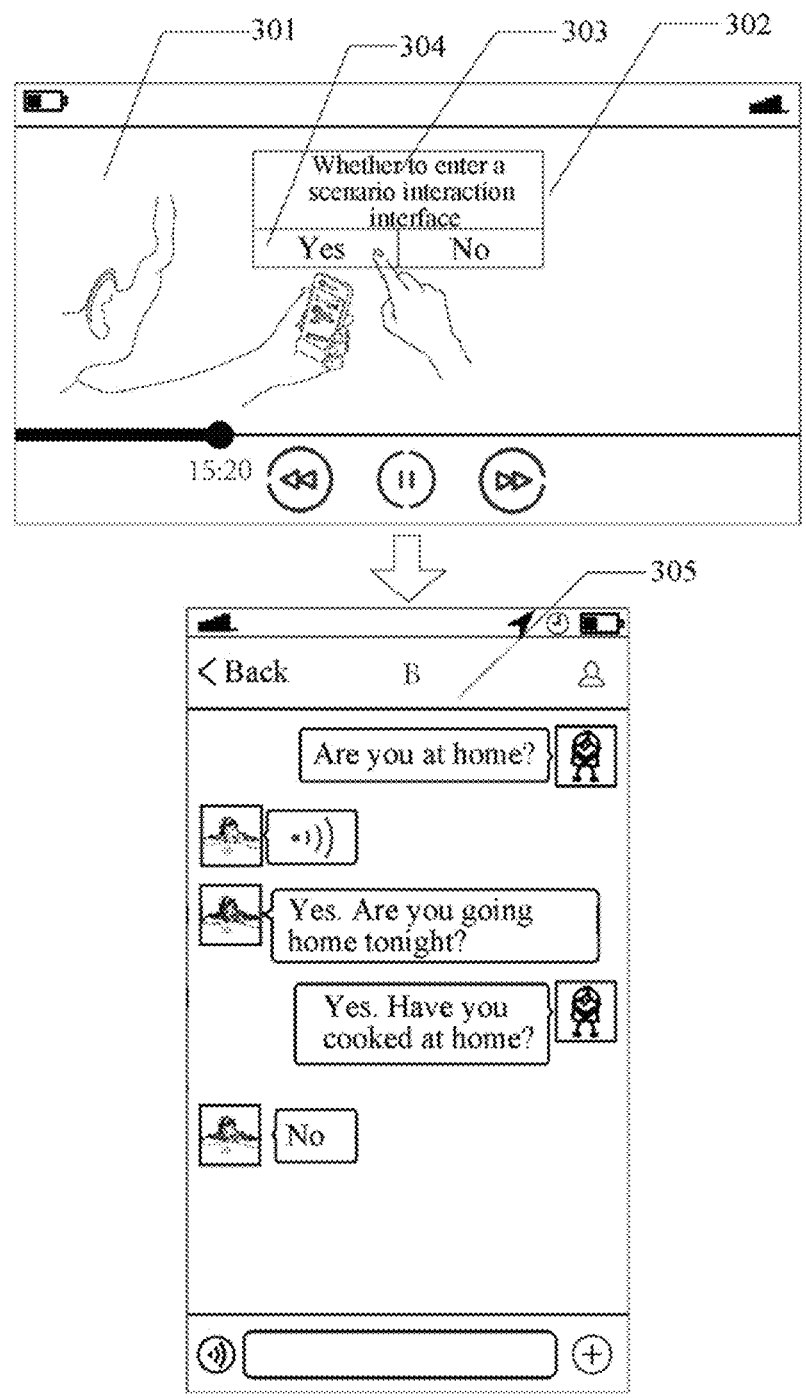
FIG. 5 is a schematic diagram of displaying a prompt interface according to an embodiment of this application.

Optionally, the prompt interface includes a confirmation control and prompt information, and the prompt information is used for prompting the user whether to switch to the scenario interaction interface. The user clicks/taps the confirmation control in the prompt interface, and correspondingly, the terminal obtains a trigger signal on the confirmation control, that is, a switching signal, and switches the play interface to the scenario interaction interface. The prompt interface further includes a reject control. The user clicks/taps the reject control in the prompt interface, and correspondingly, the terminal obtains a trigger signal on the reject control, and continues to play the first video in the play interface. For example, as shown in FIG. 5, a terminal displays a prompt interface 302 on an upper layer of a play interface 301. The prompt interface 302 includes prompt information 303: whether to enter a scenario interaction interface, and a confirmation control 304. A user clicks/taps the confirmation control 304 in the prompt interface 302, and correspondingly, the terminal switches the play interface 301 to a scenario interaction interface 305.

In step 204, the play interface is switched by the terminal to a scenario interaction interface in a case that a switching signal is obtained. For example, the play interface is switched by the terminal to the scenario interaction interface in a case that a switching signal is obtained through the prompt interface.

The terminal switches the play interface to the scenario interaction interface when obtaining a switching signal indicating that the user confirms to switch to the scenario interaction interface. The scenario interaction interface may be set according to video content of the first video at the preset playback time. For example, the scenario interaction interface is set according to display content of an electronic device shown in the first video. The user may interact with the terminal in the scenario interaction interface. The scenario interaction interface is set according to the video content. Therefore, the scenario interaction interface simulates a scenario in the video content, so that the user can interact in a scenario that is the same as that in the video content, thereby improving user immersion and attracting the user to interact.

In a possible implementation, the video content of the first video at the preset playback time includes instant messaging content, and in this case, the scenario interaction interface is an instant messaging interface set according to the instant messaging content. The instant messaging content is video content in which characters in a video communicate with each other by using instant messaging software, for example, chart by using short messages. In this case, the scenario interaction interface is set to be an instant messaging interface consistent with the instant messaging content in the first video. A user inputs interaction information in the instant messaging interface. The interaction information includes text information or audio information. Correspondingly, the terminal interacts with the user according to the interaction information inputted by the user.

Figure 6:
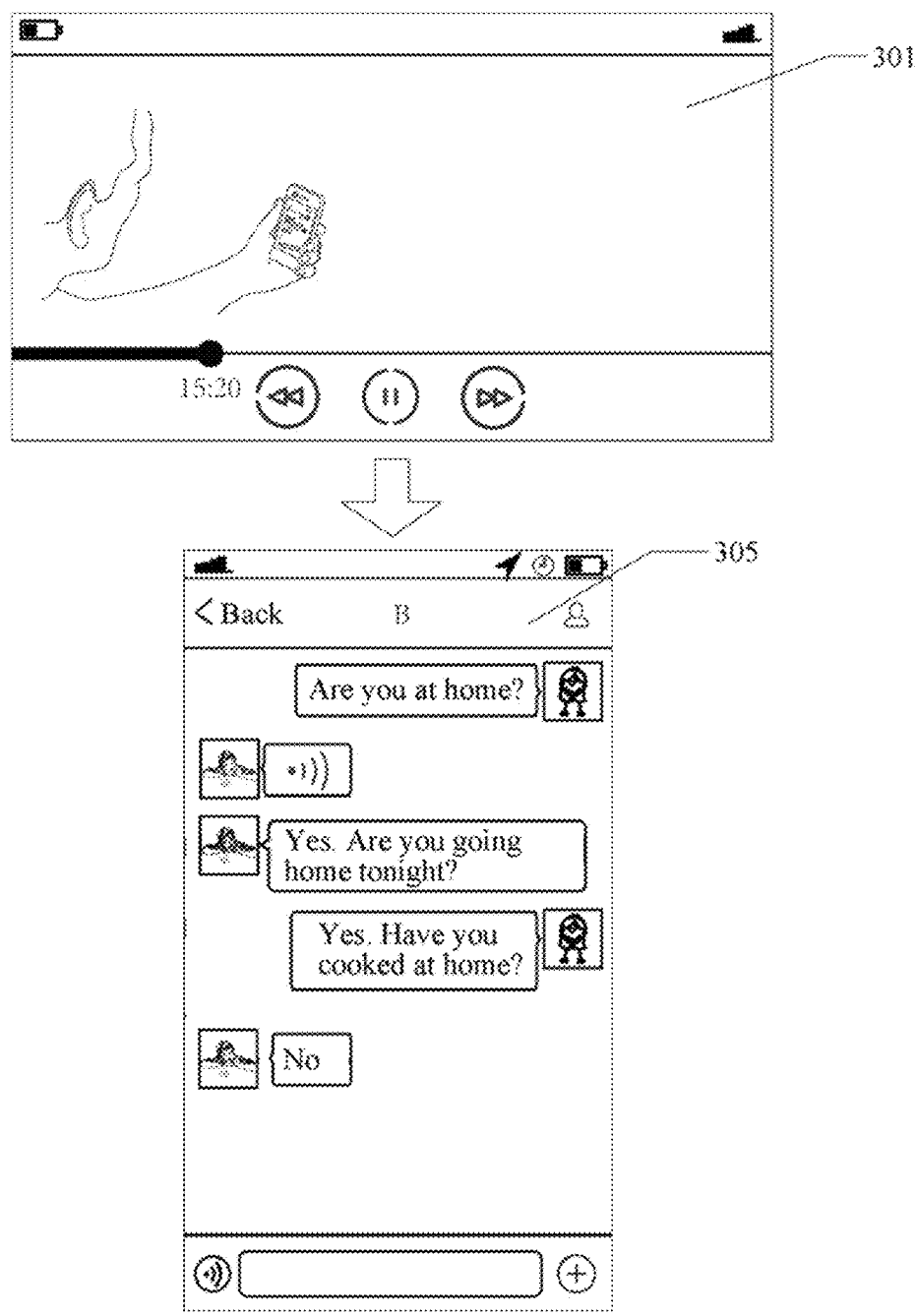
FIG. 6 is a schematic diagram of switching a play interface to a scenario interaction interface according to an embodiment of this application.

For example, in the first video, a character A and a character B chat by using instant messaging software. In this case, a user can see in the first video, an instant messaging interface of the instant messaging software during chatting of the character A. In this case, as shown in FIG. 6, the terminal switches the play interface 301 to a scenario interaction interface, and the scenario interaction interface is an instant messaging interface 305 of the instant messaging software during chatting of the character A. The user, as the character A, inputs interaction information in the instant messaging interface 305, and the terminal, as the character B, interacts with the user according to the interaction information inputted by the user.

In another possible implementation, the video content of the first video at the preset playback time includes call content, and in this case, the scenario interaction interface is a call interface set according to the call content. The call content is video content of a phone call between characters. In this case, the scenario interaction interface is set to be a call interface consistent with the call content in the first video. The terminal interacts with the user based on the call interface.

Figure 7:
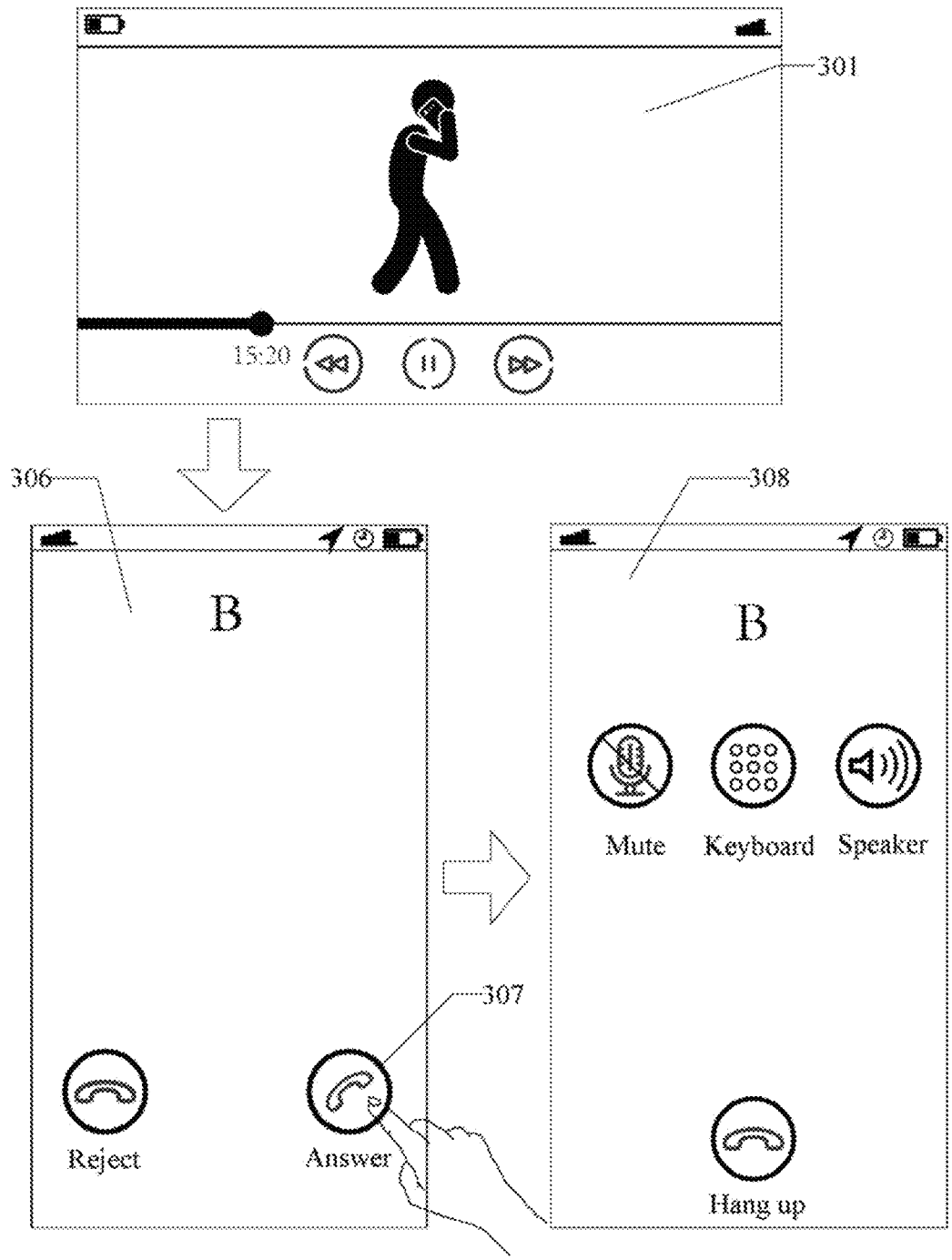
FIG. 7 is a schematic diagram of switching a play interface to a scenario interaction interface according to another embodiment of this application.

For example, in the first video, the character A receives a call from the character B. In this case, as shown in FIG. 7, the terminal switches the play interface 301 to a scenario interaction interface, and the scenario interaction interface is a call interface during a phone call between the character A and the character B. The call interface may be a call interface 306 before the call is answered. After the user clicks/taps an answer control 307 in the call interface 306, the call interface may be a call interface 308 during call answering. The terminal, as the character B, performs voice interaction with the user.

Optionally, before switching the play interface to the scenario interaction interface, the terminal transmits an interface resource request to the server. The interface resource request includes the preset playback time and a video identifier of the first video. The interface resource request is used for requesting a resource for displaying the scenario interaction interface. For example, when an instant messaging interface of instant messaging software is displayed, a picture resource of a character avatar in the instant messaging interface may be the requested resource. After receiving the interface resource request, the server determines, according to the preset playback time and the video identifier included in the interface resource request, the resource that is requested by the terminal for displaying the scenario interaction interface, and transmits the resource to the terminal. Optionally, when transmitting the first video data to the terminal, the server transmits the resource for displaying the scenario interaction interface to the terminal in advance. The terminal stores the resource, so that when switching to the scenario interaction interface, the terminal does not need to transmit the interface resource request to the server.

In step 205, interaction information of interaction performed based on the scenario interaction interface is obtained in the terminal. For example, interaction information input based on the scenario interaction interface is obtained by the terminal.

To interact with the user based on the scenario interaction interface, the terminal needs to obtain the interaction information of the user. The interaction information includes text information or audio information input by the user.

Figure 8:
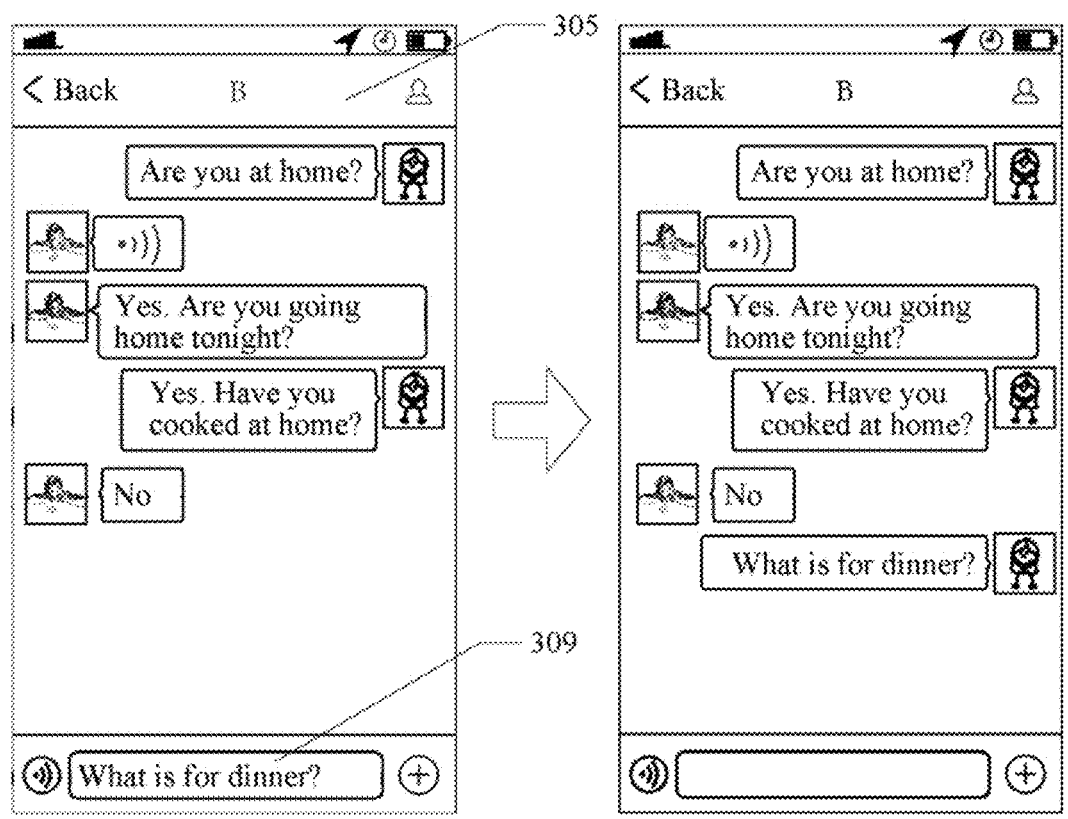
FIG. 8 is a schematic diagram of obtaining interaction information according to an embodiment of this application.

In a possible implementation, in a case that the scenario interaction interface is an instant messaging interface, the terminal obtains text information inputted by the user in the instant messaging interface as the interaction information. For example, as shown in FIG. 8, the scenario interaction interface is the instant messaging interface 305 of instant messaging software, and text information 309 inputted by the user in the instant messaging interface 305 is "What is for dinner?". The terminal obtains the text information 309 inputted by the user as the interaction information; or the terminal obtains audio information captured based on the instant messaging interface as the interaction information.

In another possible implementation, the scenario interaction interface is a call interface during call answering. The terminal obtains audio information captured based on the call interface as the interaction information. For example, the scenario interaction interface is the call interface. When the user is speaking, the terminal captures audio information of the user by using a microphone, and obtains the audio information captured based on the call interface as the interaction information.

In step 206, a target message related to the interaction information is obtained by the terminal. For example, a target message related to the obtained interaction information is obtained by the terminal.

After obtaining the interaction information, the terminal obtains the target message to be pushed (output) to the user. For example, an advertisement message to be pushed to the user is obtained. In a case that the obtained interaction information is text information, the terminal detects whether the interaction information includes a preset keyword. If the interaction information includes the preset keyword, the terminal determines a to-be-pushed message matching the preset keyword as the target message related to the interaction information. The terminal stores a correspondence between the to-be-pushed message and the preset keyword, and determines, according to the correspondence, a target message matching the preset keyword. The preset keyword may be set in advance. For example, the preset keyword is "dinner", and in this case, the to-be-pushed message matching "dinner" is an advertisement message of a restaurant. If the interaction information includes "dinner", the terminal determines that the target message to be pushed to the user is the advertisement message of the restaurant. The server transmits the to-be-pushed message to the terminal in advance, and correspondingly, the terminal stores the to-be-pushed message. After determining the target message to be pushed, the terminal directly obtains the stored target message locally.

Optionally, in a case that the interaction information is audio information, the terminal converts the audio information into text information by using a voice recognition technology, and then detects whether the text information includes the preset keyword.

Optionally, the terminal obtains a current location of the user, and obtains the target message according to the preset keyword and the current location of the user. For example, the preset keyword is "dinner", and in this case, the to-be-pushed message matching "dinner" is an advertisement message of a restaurant. If the interaction information includes "dinner", the terminal determines that an advertisement message of a restaurant is to be pushed to the user. Then the terminal determines, according to the current location of the user, a restaurant within a preset distance from the current location, and obtains an advertisement message of the restaurant as the target message. The preset distance may also be set in advance, or may be customized by a user.

Optionally, the terminal stores a push level of each to-be-pushed message. The push level is used for indicating a priority of the to-be-pushed message. A higher push level indicates a higher priority, and a lower push level indicates a lower priority. When pushing a message, the terminal preferentially pushes a message with a higher priority. For example, the terminal determines two target messages according to the preset keyword in the interaction information: a target message A and a target message B. The push level of the target message A is higher that the push level of the target message B, and therefore, the terminal preferentially obtains the target message A, and pushes the target message A.

Optionally, if the interaction information does not include the preset keyword, the terminal obtains the target message according to the current location of the user and the push level of each to-be-pushed message.

In step 207, the target message is pushed by the terminal based on the scenario interaction interface. For example, the obtained target message is output by the processing circuitry of the terminal.

After obtaining the target message, the terminal pushes the target message based on the scenario interaction interface. In a case that the scenario interaction interface is an instant messaging interface, the terminal displays a text message of the target message in the instant messaging interface, or plays an audio message of the target message based on the instant messaging interface. The text message of the target message is displayed in a text form, for example, a written text or an emoticon. The audio message of the target message is played in an audio form In a case that the scenario interaction interface is a call interface, the terminal plays the audio message of the target message based on the call interface. Optionally, in a case that the scenario interaction interface is a call interface, the terminal plays the audio message of the target message based on the call interface, and further displays the text message of the target message in the call interface.

Figure 9:
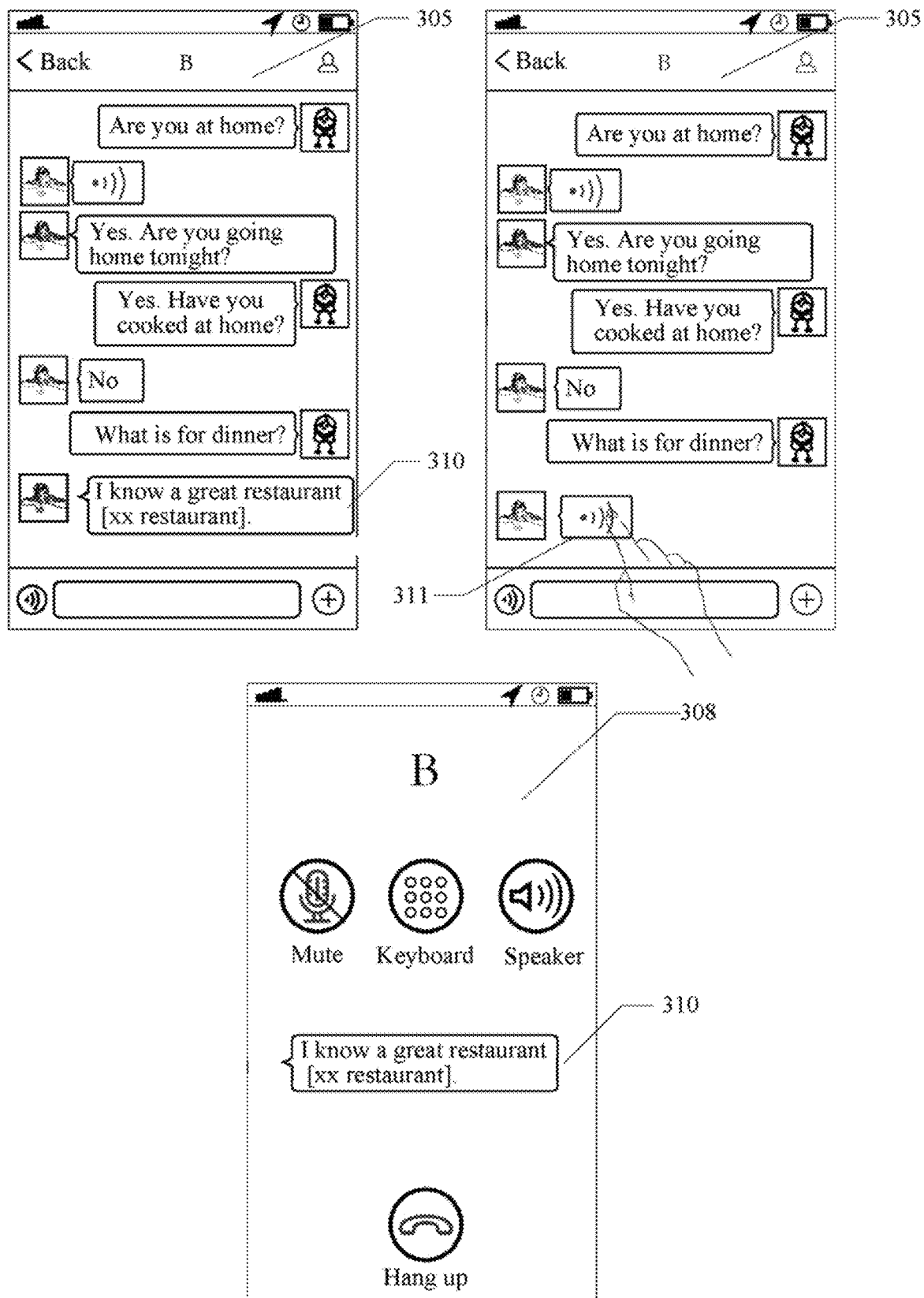
FIG. 9 is a schematic diagram of pushing a target message according to an embodiment of this application.

For example, as shown in FIG. 9, the scenario interaction interface is the instant messaging interface 305 of instant messaging software. The terminal may display a text message 310 of the target message in the instant messaging interface 305, and may also display an audio message 311 of the target message in the instant messaging interface 305. After the user clicks/taps, the terminal plays the audio message of the target message. In a case that the scenario interaction interface is the call interface 308, the terminal may play the audio message of the target message, and display the text message 310 of the target message in the call interface 308 at the same time.

Optionally, in a case that the scenario interaction interface is a call interface before the call is answered, the interaction information is a trigger signal on an answer control in the call interface. When obtaining the trigger signal on the answer control in the call interface, the terminal plays the audio message of the target message. The audio message of the target message is a preset audio message.

Optionally, the terminal generates the text message of the target message according to a verbal habit of a character in the first video and content of the target message. For example, the terminal generates, according to a word order and a wording habit of the character in the first video with reference to the content of the target message, a text message that conforms to the verbal habit of the character. In addition, the terminal generates the audio message of the target message according to a voice of the character in the first video and the content of the target message. In this case, when the audio message is finally played, the terminal plays the audio message by using the voice of the character in the first video.

Optionally, the text message and the audio message of the target message are generated by an artificial intelligence (AI) model. The AI model is obtained by training a neural network model by using at least one of preset text samples or preset audio samples. For example, the neural network model is trained by using text samples of lines of the character and/or audio samples of the voice of the character in the first video.

Optionally, after obtaining the interaction information, the terminal does not obtain or push the target message. Instead, the terminal simulates the character in the first video by using the AI model to interact with the user. For example, the obtained interaction information is "What is for dinner?", and the terminal simulates, by using the AI model, the character in the first video to reply "I will cook for you". By simulating the character in the first video, user immersion is improved, and the user is attracted to interact, thereby increasing a probability that the user adopts the subsequently pushed target message.

Figure 10:
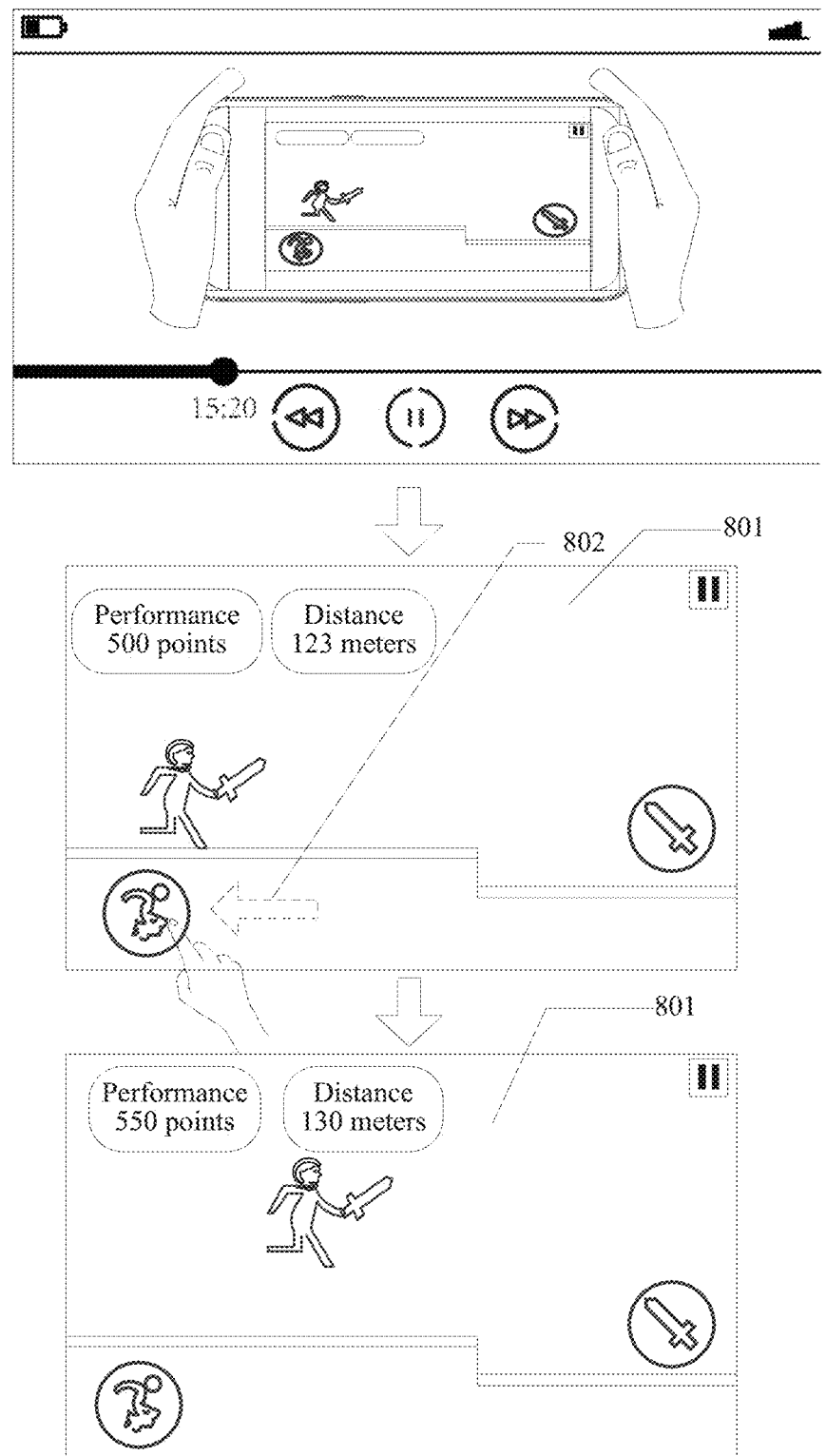
FIG. 10 is a schematic diagram of a game demo interface according to an embodiment of this application.

In a possible implementation, if the video content of the first video at the preset playback time includes game content, the scenario interaction interface is a game demo interface set according to the game content. The game content is video content showing that a character in the video plays a game by using a terminal. In this case, the scenario interaction interface is set to be a game demo interface matching the game content in the first video. A user performs an operation according to a picture displayed in the game demo interface. Correspondingly, the terminal obtains an operation signal triggered by the operation performed by the user in the game demo interface. The terminal plays a third video in the game demo interface according to the operation signal. The third video is a video set according to the game content in the first video, to demonstrate a game effect to the user. When the user performs an operation according to the picture displayed in the game demo interface, the terminal displays guide information in the game demo interface, or synthesizes the voice of the character in the first video to play a voice guide, to guide the user to perform a corresponding operation. The server may transmit third video data of the third video to the terminal while transmitting the first video data; or the terminal may request the third video data from the server before the third video needs to be played. A specific manner in which the terminal obtains the third video data is not specifically limited in this embodiment of the disclosure. For example, as shown in FIG. 10, the video content of the first video is game content, and the user slides left according to prompt information 802 displayed in a game demo interface 801. Correspondingly, the terminal obtains an operation signal triggered by the user by sliding left, and plays the third video in the game demo interface 801 according to the operation signal. Optionally, when playing the third video, the terminal pauses playback, and displays new guide information to guide the user to perform an operation. When an operation signal triggered by an operation of the user is obtained, the terminal continues to play the third video. A process of playing a game is simulated by pausing, displaying new guide information, obtaining an operation signal, and continuing playback for a plurality of times, thereby achieving an objective of pushing the game to the user.

In another possible implementation, if the video content of the first video at the preset playback time includes game content, the scenario interaction interface is a game interface set according to the game content. The game interface is an interface for playing a game matching the game content in the first video. A user may try the game in the game interface, and thus an objective of pushing the game to the user is achieved. The game interface may be an interface of an application of the game, or may be a page based on a HyperText Markup Language (HTML) 5 standard. During a process in which the user tries the game, the terminal obtains a control instruction inputted by the user in the game interface, and performs a corresponding game operation in the game interface according to the control instruction. When the user tries the game, the terminal displays guide information in the game interface, or synthesizes a voice of a character in the first video to play a voice guide, to guide the user to play.

Optionally, after pushing the target message, the terminal switches the scenario interaction interface to the play interface, and then plays a second video in the play interface according to second video data. Video content of the second video includes reward content related to the video content of the first video. The reward content is voice content for encouraging the user to enter the scenario interaction interface, for example, and/or video content including an additional plot related to the video content of the first video. The server may transmit the second video data to the terminal while transmitting the first video data or the terminal may request the second video data from the server before playing the second video. In the foregoing manner, the user is attracted to enter the scenario interaction interface to watch or listen to the pushed message, so that a probability of the user watching or listening to the pushed message is increased.

In this embodiment of the disclosure, during playback of the first video, the terminal obtains, according to the interaction information of the interaction performed based on the scenario interaction interface, the target message to be pushed, and pushes the target message based on the scenario interaction interface. The scenario interaction interface is set according to the video content of the first video, and has a relatively high correlation with the video content of the first video. Therefore, a user may be attracted, so that a probability of the user watching or listening to the target message is relatively high when the target message is pushed based on the scenario interaction interface, thereby increasing a probability that the user adopts the target message.

Figure 11:
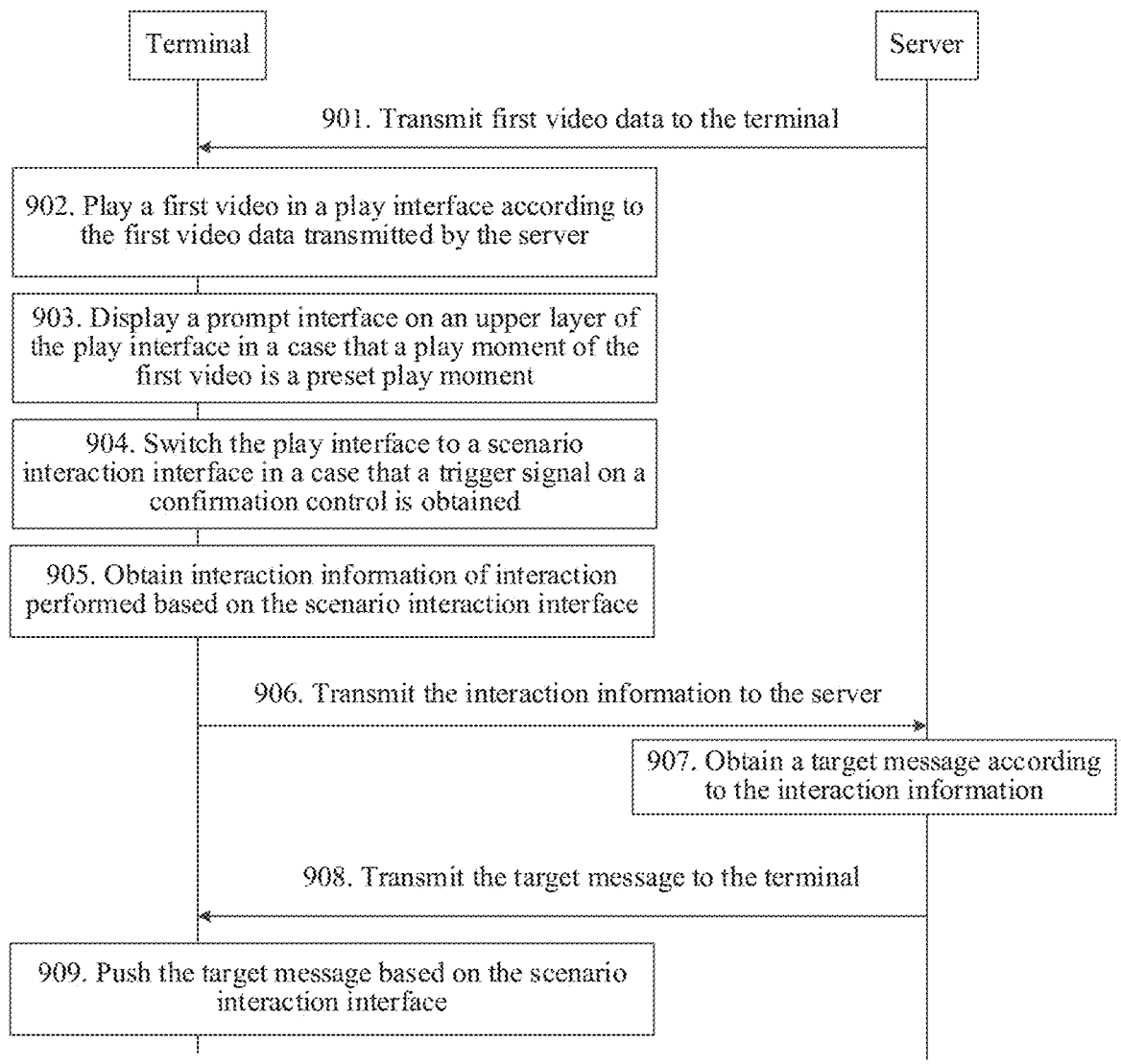
FIG. 11 is a flowchart of a message push method according to another embodiment of this application.

FIG. 11 is a flowchart of a message push method according to another embodiment of the disclosure. The method may be applied to the implementation environment shown in FIG. 1 The method may include the following steps. In step 901, first video data is transmitted by a server to a terminal.

Step 901 is the same as step 201 in the embodiment provided in FIG. 4, For details, refer to the embodiment in FIG. 4. Details are not described herein again in this embodiment.

In step 902, a first video is played by the terminal in a play interface according to the first video data transmitted by the server.

After receiving the first video data transmitted by the server, the terminal loads the first video data, and plays the first video in the play interface.

Optionally, a proxy plug-in in the terminal receives the first video data transmitted by the server. A scheduler in the terminal instructs a play plug-in to play the first video according to the first video data.

In step 903, a prompt interface is displayed by the terminal on an upper layer of the play interface in a case that a play moment of the first video is a preset play moment. For example, a prompt interface is displayed by the terminal together with the play interface at a preset playback time of the first video, the prompt interface requesting to switch to a scenario interaction interface, and the scenario interaction interface being set according to video content shown in the first video at the preset playback time.

The prompt interface includes a confirmation control and prompt information, and the prompt information is used for prompting a user whether to switch to a scenario interaction interface. The prompt interface further includes a reject control. The user clicks/taps the reject control in the prompt interface. Correspondingly, the terminal obtains a trigger signal on the reject control, and thus continues to play the first video in the play interface.

In step 904, the play interface is switched by the terminal to a scenario interaction interface in a case that a trigger signal on a confirmation control is obtained. For example, step 904 includes the terminal switching the play interface to the scenario interaction interface in a case that a switching signal is obtained through the prompt interface.

The user clicks/taps the confirmation control in the prompt interface. Correspondingly, the terminal obtains the trigger signal on the confirmation control, and thus switches the play interface to the scenario interaction interface.

Optionally, based on FIG. 2, step 904 includes the following sub-steps:

In step 904*a*, the trigger signal is obtained by a scheduler on the confirmation control.

The user clicks/taps the confirmation control in the prompt interface, and correspondingly, the scheduler in the terminal obtains the trigger signal on the confirmation control.

In step 904*b*, a resource confirmation instruction is transmitted by the scheduler to a message plug-in.

After obtaining the trigger signal on the confirmation control, the scheduler determines to switch to the scenario interaction interface, and transmits the resource confirmation instruction to the message plug-in. The resource confirmation instruction is used for instructing the message plug-in to confirm whether a resource for displaying the scenario interaction interface is stored.

In step 904*c*, whether a resource for displaying the scenario interaction interface is stored is confirmed by the message plug-in.

The message plug-in confirms, according to the resource confirmation instruction, whether the resource for displaying the scenario interaction interface is stored. If not, step 904*d* is performed: or if yes, step 904*g* is performed.

In step 904*d*, a resource obtaining instruction is transmitted by the message plug-in to the scheduler.

The resource obtaining instruction is used for instructing the scheduler to obtain the resource for displaying the scenario interaction interface.

In step 904*e*, an interface resource request is transmitted by the scheduler to the server by using a proxy plug-in.

After receiving the resource obtaining instruction, the scheduler transmits the interface resource request to the server by using the proxy plug-in. The interface resource request includes a preset playback time and a video identifier of the first video. The interface resource request is used for requesting the resource for displaying the scenario interaction interface. For example, when an instant messaging interface of instant messaging software is displayed, a picture resource of a character avatar in the instant messaging interface is requested as the resource.

In step 904*f*, the resource for displaying the scenario interaction interface is received by the proxy plug-in, the resource being transmitted by the server.

After receiving the interface resource request, the server determines, according to the preset playback time and the video identifier included in the interface resource request, the terminal-requested resource for displaying the scenario interaction interface, and transmits the resource to the terminal. The proxy plug-in in the terminal receives and stores the resource for displaying the scenario interaction interface transmitted by the server, and transmits a storage path of the resource to the scheduler.

In step 904*g*, an interface switching instruction is transmitted by the message plug-in to the scheduler.

After it is determined that the resource for displaying the scenario interaction interface is stored, the message plug-in transmits the interface switching instruction to the scheduler.

In step 904*h*, the play interface is switched by the scheduler to the scenario interaction interface according to the interface switching instruction.

The scheduler obtains, according to the storage path of the resource for displaying the scenario interaction interface, the resource for displaying the scenario interaction interface, and then switches the play interface to the scenario interaction interface according to the resource.

In step 905, interaction information of interaction performed based on the scenario interaction interface is obtained by the terminal.

To interact with the user based on the scenario interaction interface, the terminal needs to obtain interaction information input by the user. The interaction information includes text information or audio information.

Optionally, the interaction plug-in in the terminal obtains the interaction information of interaction performed based on the scenario interaction interface.

In step 906, the interaction information is transmitted by the terminal to the server.

After the terminal obtains the interaction information, a target message to be pushed to the user needs to be determined by the server. Therefore, the interaction information is transmitted to the server. Optionally, the terminal obtains a current location of the user, and transmits the location to the server.

Optionally, the interaction plug-in transmits the obtained interaction information to the scheduler, and the scheduler transmits the interaction information to the server by using the proxy plug-in.

In step 907, a target message is obtained by the server according to the interaction information.

In a case that the obtained interaction information is text information, the server detects whether the received interaction information includes a preset keyword. If the interaction information includes the preset keyword, the server determines a target message matching the preset keyword. The server stores a correspondence between a to-be-pushed message and the preset keyword, and determines, according to the correspondence, the to-be-pushed message matching the preset keyword as the target message related to the interaction information. The preset keyword may be set in advance.

The server obtains the target message from to-be-pushed messages, and the server stores content, a message identifier, a push time, and a push level of each message. One message identifier is used for uniquely identifying one message. The to-be-pushed message is determined by the server according to the push time of each message. The push time of the message is used for indicating a period of time during which the message can be pushed. For example, a push time of a message A is 18:00 to 23:00 in the evening. If it is 14:00 p.m. when determining the target message, the server does not use the message A as a to-be-pushed message for determining the target message. The push time may alternatively be a date. For example, if a push time of a message B is from November to February, the server does not use the message B as a to-be-pushed message for determining the target message from March to October.

Optionally, in a case that the interaction information is audio information, the server converts the audio information into text information by using a voice recognition technology, and then detects whether the text information includes the preset keyword.

Optionally, the server receives the current location of the user, and obtains the target message according to the preset keyword and the current location of the user.

Optionally, the server stores a push level of each to-be-pushed message. The push level is used for indicating a priority of the to-be-pushed message. A higher push level indicates a higher priority, and a lower push level indicates a lower priority. When determining the target message to be pushed, the server preferentially pushes a message with a higher priority.

Optionally, if the interaction information does not include the preset keyword, the terminal obtains the target message according to the current location of the user and the push level of each to-be-pushed message.

Optionally, if the target message is determined by the terminal, the interaction plug-in in the terminal obtains the target message according to the interaction information.

In step 908, the target message is transmitted by the server to the terminal.

The server stores to-be-pushed messages. After determining the target message to be pushed, the server transmits the target message to the terminal. The server may transmit the text message and the audio message of the target message to the terminal simultaneously, or may separately transmit the text message or the audio message of the target message.

Optionally, the server generates the text message of the target message according to a verbal habit of a character in the first video and content of the target message. In addition, the server generates the audio message of the target message according to a voice of the character in the first video and the content of the target message. In this case, when the audio message is finally played, the terminal plays the audio message by using the voice of the character in the first video.

Optionally, the text message and the audio message of the target message are generated by an artificial intelligence model. The artificial intelligence model is obtained by training a neural network model by using preset text samples and/or preset audio samples. For example, the neural network model is trained by using text samples of lines of the character and/or audio samples of the voice of the character in the first video.

Optionally, the proxy plug-in in the terminal receives the target message transmitted by the server.

In step 909, the target message is pushed (output) by the terminal based on the scenario interaction interface.

After obtaining the target message, the terminal pushes the target message based on the scenario interaction interface. In a case that the scenario interaction interface is an instant messaging interface, the terminal displays the text message of the target message in the instant messaging interface; and/or plays the audio message of the target message based on the instant messaging interface. In a case that the scenario interaction interface is a call interface, the terminal plays the audio message of the target message based on the call interface. Optionally, in a case that the scenario interaction interface is a call interface, the terminal plays the audio message of the target message in the call interface, and further displays the text message of the target message in the call interface.

Optionally, in a case that the terminal does not obtain or push the target message after obtaining the interaction information, but simulates the character in the first video to interact with the user, the terminal transmits the obtained interaction information to the server. The server generates information of interaction with the user, and transmits the information to the terminal. The terminal then displays the information, to simulate the character in the first video to interact with the user. The character in the first video is simulated, so that the user is attracted to interact, thereby increasing a probability that the user adopts a subsequently pushed message.

Optionally, the scheduler in the terminal pushes the target message by using the interaction plug-in.

Optionally, if the video content of the first video at the preset playback time includes game content, the scenario interaction interface is a game demo interface set according to the game content. In this case, the scenario interaction interface is set to be a game demo interface matching the game content in the first video. The user performs an operation according to a picture displayed in the game demo interface. Correspondingly, the terminal obtains an operation signal triggered by the operation performed by the user in the game demo interface. The terminal plays a third video in the game demo interface according to the operation signal. The third video is a video set according to the game content in the first video, to demonstrate a game effect to the user. The server may transmit third video data of the third video to the terminal while transmitting the first video data or the terminal may request the third video data from the server before the third video is to be played. A specific manner in which the terminal obtains the third video data is not specifically limited in this embodiment of the disclosure. Optionally, the play plug-in in the terminal plays the third video.

Optionally, after step 909, the method further includes the following steps:

In step 910, a video request is transmitted by the terminal to the server.

After pushing the target message, the terminal transmits the video request to the server. The video request is used for requesting the server to transmit second video data.

Optionally, the video request includes a message identifier of the target message. The terminal reports the pushed message to the server by using the message identifier.

Optionally, after the target message is pushed, the scheduler transmits the video request to the server by using the proxy plug-in. When data exchange is performed between the terminal and the server by using a CDN, the proxy plug-in requests the second video data from the server by switching a CDN path.

In step 911, second video data is transmitted by the server to the terminal according to the video request.

After receiving the video request transmitted by the terminal, if it is determined that the terminal has pushed the target message, the server transmits the second video data to the terminal.

In step 912, the scenario interaction interface is switched by the terminal to the play interface.

Step 912 may be performed before step 910 and step 911, or may be performed after step 910 and step 911, and may be performed simultaneously with step 910 and step 911.

Optionally, the scheduler in the terminal switches the scenario interaction interface to the play interface.

In step 913, a second video is played by the terminal in the play interface according to the second video data.

After switching the scenario interaction interface to the play interface, the terminal plays the second video in the play interface according to the second video data. In the foregoing manner, the user is attracted to enter the scenario interaction interface to watch or listen to the pushed message, so that a probability of the user watching the pushed message is increased.

Optionally, the terminal plays the second video by using the play plug-in.

In this embodiment of the disclosure, during playback of the first video, the terminal obtains, from the server according to the interaction information of interaction performed based on the scenario interaction interface, the target message to be pushed, and pushes the target message based on the scenario interaction interface. The scenario interaction interface is set according to the display content of the electronic device shown in the first video, and has a relatively high correlation with the video content of the first video. Therefore, a user may be attracted, so that a probability of the user watching or listening to the target message is relatively high when the target message is pushed based on the scenario interaction interface, thereby increasing a probability that the user adopts the target message.

The following are apparatus embodiments of the disclosure, which can be used to execute the method embodiments of the disclosure. For details not disclosed in the apparatus embodiments of the disclosure, refer to the method embodiments of the disclosure.

Figure 12:
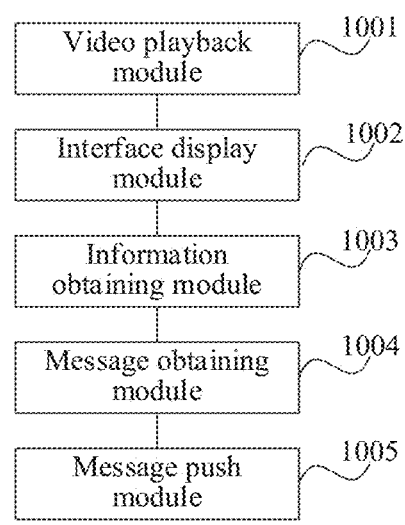
FIG. 12 is a schematic diagram of a message push apparatus according to an embodiment of this application.

FIG. 12 is a block diagram of a message push apparatus according to an embodiment of the disclosure. The apparatus has a function of implementing the method on the terminal side in the foregoing embodiments. The function may be implemented by using hardware, or may be implemented by hardware executing corresponding software. The apparatus may be a terminal, or may be disposed in a terminal. The apparatus may include a video playback module 1001, an interface display module 1002, an information obtaining module 1003, a message obtaining module 1004, and a message push module 1005.

The video playback module 1001 is configured to play a first video in a play interface according to first video data transmitted by a server.

The interface display module 1002 is configured to display a scenario interaction interface at a preset playback time of the first video, the scenario interaction interface being set according to display content of an electronic device shown in the first video.

The information obtaining module 1003 is configured to obtain interaction information of interaction performed based on the scenario interaction interface.

The message obtaining module 1004 is configured to obtain a target message related to the interaction information.

The message push module 1005 is configured to push (output) the target message based on the scenario interaction interface.

In this embodiment of the disclosure, during playback of the first video, the terminal obtains, according to the interaction information of interaction performed based on the scenario interaction interface, the target message to be pushed, and pushes the target message based on the scenario interaction interface. The scenario interaction interface is set according to the display content of the electronic device shown in the first video, and has a relatively high correlation with the video content of the first video. Therefore, a user may be attracted, so that a probability of the user watching or listening to the target message is relatively high when the target message is pushed based on the scenario interaction interface, thereby increasing a probability that the user adopts the target message.

Optionally, the message obtaining module 1004 is configured to transmit the interaction information to the server; and receive the target message transmitted by the server, the target message being obtained by the server according to the interaction information.

Optionally, the interface display module 1002 is further configured to switch the scenario interaction interface to the play interface. The video playback module 1001 is further configured to play a second video in the play interface according to second video data, video content of the second video including reward content related to video content of the first video.

Optionally, the apparatus further includes a video request module. The video request module is configured to transmit a video request to the server, the video request being used for requesting the server to transmit the second video data, and receive the second video data transmitted by the server.

Optionally, the display content of the electronic device shown in the first video includes instant messaging content, and the scenario interaction interface is an instant messaging interface set according to the instant messaging content. The information obtaining module 1003 is configured to obtain text information inputted in the instant messaging interface, or obtain audio information captured based on the instant messaging interface.

Optionally, the message push module 1005 is configured to display a text message of the target message in the instant messaging interface, the text message of the target message being generated by an artificial intelligence model, and the artificial intelligence model being obtained by training a neural network model by using preset text samples and/or preset audio samples. Additionally or alternatively, message push module 1005 is configured to play an audio message of the target message based on the instant messaging interface, the audio message of the target message being generated by an artificial intelligence model, and the artificial intelligence model being obtained by training a neural network model by using preset text samples and/or preset audio samples.

Optionally, the display content of the electronic device shown in the first video includes call content, and the scenario interaction interface is a call interface set according to the call content. The information obtaining module 1003 is configured to obtain a trigger signal on an answer control in the call interface, or obtain audio information captured based on the call interface.

Optionally, the message push module 1005 is configured to play an audio message of the target message based on the call interface, the audio message of the target message being a preset audio message; or the audio message of the target message being generated by an artificial intelligence model, and the artificial intelligence model being obtained by training a neural network model by using preset text samples and/or preset audio samples.

Optionally, the display content of the electronic device shown in the first video includes game content, and the scenario interaction interface is a game demo interface set according to the game content. The apparatus further includes a signal obtaining module. The signal obtaining module is configured to obtain an operation signal in the game demo interface. The video playback module 1001 is further configured to play a third video in the game demo interface according to the operation signal, the third video being a video set according to the game content.

Optionally, the display content of the electronic device shown in the first video includes game content, and the scenario interaction interface is a game interface set according to the game content. The apparatus further includes a game operation module. The game operation module is configured to obtain a control instruction in the game interface, and perform a corresponding game operation in the game interface according to the control instruction.

Optionally, the interface display module 1002 is further configured to display a prompt interface together with the play interface at the preset playback time, the prompt interface being used for prompting whether (requesting) to switch to the scenario interaction interface. In this embodiment, the interface display module 1002 is further configured to perform the operation of displaying a scenario interaction interface in a case that a switching signal is obtained.

Figure 13:
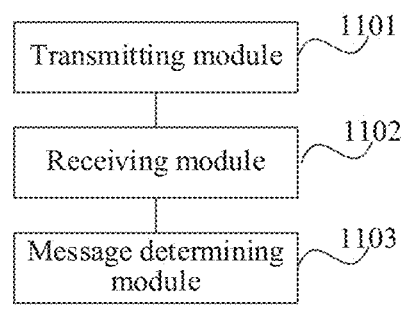
FIG. 13 is a schematic diagram of a message push apparatus according to an another embodiment of this application.

FIG. 13 is a block diagram of a message push apparatus according to another embodiment of the disclosure. The apparatus has a function of implementing the method on the server side in the foregoing embodiments. The function may be implemented by using hardware, or may be implemented by hardware executing corresponding software. The apparatus may be a server, or may be disposed in a server. The apparatus may include a transmitting module 1101, a receiving module 1102, and a message determining module 1103.

The transmitting module 1101 is configured to transmit a first video to a terminal.

The receiving module 1102 is configured to receive interaction information transmitted by the terminal, the interaction information being obtained by the terminal based on a scenario interaction interface, and the scenario interaction interface being set according to display content of an electronic device shown in the first video played by the terminal in a play interface.

The message determining module 1103 is configured to obtain a target message according to the interaction information.

The transmitting module 1101 is further configured to transmit the target message to the terminal, so that the terminal pushes the target message based on the scenario interaction interface.

In this embodiment of the disclosure, during playback of the first video, the terminal obtains, from the server according to the interaction information of interaction performed based on the scenario interaction interface, the target message to be pushed, and pushes the target message based on the scenario interaction interface. The scenario interaction interface is set according to the display content of the electronic device shown in the first video, and has a relatively high correlation with the video content of the first video. Therefore, a user may be attracted, so that a probability of the user watching or listening to the target message is relatively high when the target message is pushed based on the scenario interaction interface, thereby increasing a probability that the user adopts the target message.

Optionally, the message determining module 1103 is configured to detect whether the interaction information includes a preset keyword, and to determine a target message matching the preset keyword in a case that the interaction information includes the preset keyword.

Optionally, the receiving module 1102 is further configured to receive a video request transmitted by the terminal. The transmitting module 1101 is further configured to transmit second video data to the terminal according to the video request, so that the terminal plays a second video according to the second video data, video content of the second video including reward content related to video content of the first video.

An exemplary embodiment of the disclosure further provides a message push system, including a terminal and a server. The terminal includes the message push apparatus provided in the embodiment shown in FIG. 12, The server includes the message push apparatus provided in the embodiment shown in FIG. 13.

When the apparatuses provided in the foregoing embodiments implement the functions thereof, division of the foregoing function modules is merely used as an example for description. In the practical application, the functions may be allocated to and completed by different function modules according to requirements. That is, an internal structure of the device is divided into different function modules, to complete all or some of the functions described above. In addition, the apparatus and method embodiments provided in the foregoing embodiments are based on the same concept. For the specific implementation process, refer to the method embodiments, and details are not described herein again.

Figure 14:
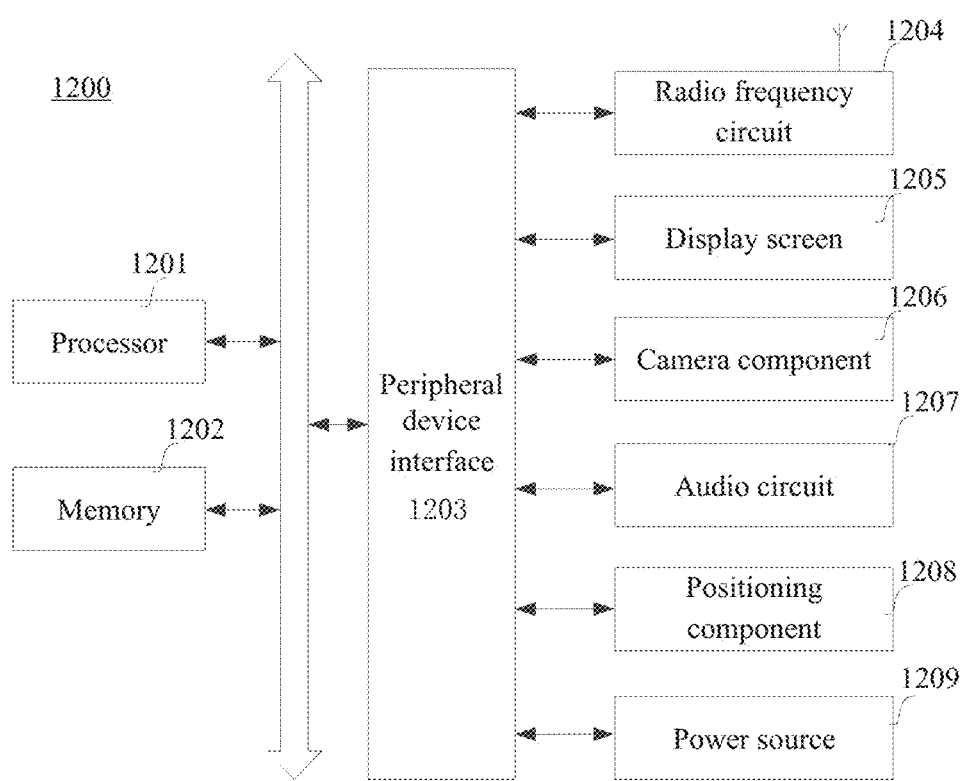
FIG. 14 is a schematic structural diagram of a terminal according to an embodiment of this application.

FIG. 14 is a structural block diagram of a terminal 1200 according to an exemplary embodiment of the disclosure. The terminal 1200 may be a portable mobile terminal, for example, a smartphone, a tablet computer, a moving picture experts group audio layer Hi (MP3) player, a moving picture experts group audio layer IV (MP4) player, a laptop, or a desktop computer. The terminal 1200 may also be referred to as another name such as user equipment, a portable terminal, a laptop terminal, a desktop terminal, and the like.

Generally, the terminal 1200 includes processing circuitry, such as a processor 1201, and a memory 1202.

The processor 1201 may include one or more processing cores, for example, a 4-core processor, or an 8-core processor. The processor 1201 may be implemented in at least one of the following hardware forms: digital signal processing (DSP), a field-programmable gate array (FPGA), and a programmable logic array (PIA). The processor 1201 may also include a main processor and a coprocessor. The main processor is a processor configured to process data in an awake state, and is also referred to as a central processing unit (CPU). The coprocessor is a low-power-consumption processor configured to process data in a standby state. In some embodiments, the processor 1201 may be integrated with a graphics processing unit (GPU). The GPU is configured to be responsible for rendering and drawing content that a display screen needs to display. In some embodiments, the processor 1201 may further include an artificial intelligence (AI) processor. The AI processor is configured to process a computing operation related to machine learning.

The memory 1202 may include one or more computer-readable storage media. The one or more computer-readable storage media may be non-transient. The memory 1202 may further include a high-speed random access memory and a non-volatile memory, for example, one or more disk storage devices, or flash memory devices. In some embodiments, the non-transient computer-readable storage medium in the memory 1202 is configured to store at least one instruction, and the at least one instruction is used for being executed by the processor 1201 to implement the message push method provided in the method embodiments of the disclosure.

In some embodiments, the terminal 1200 may optionally include: a peripheral device interface 1203 and at least one peripheral device. The processor 1201, the memory 1202, and the peripheral device interface 1203 may be connected by using a bus or a signal cable. Each peripheral device may be connected to the peripheral device interface 1203 by using a bus, a signal cable, or a circuit board. Specifically, the peripheral device includes: at least one of a radio frequency (RF) circuit 1204, a touch display screen 1205, a camera component 1206, an audio circuit 1207, a positioning component 1208, and a power source 1209.

A person skilled in the art may understand that the structure shown in FIG. 14 constitutes no limitation on the terminal 1200, and the terminal may include more or fewer components than those shown in the figure, or some components may be combined, or a different component deployment may be used.

Figure 15:
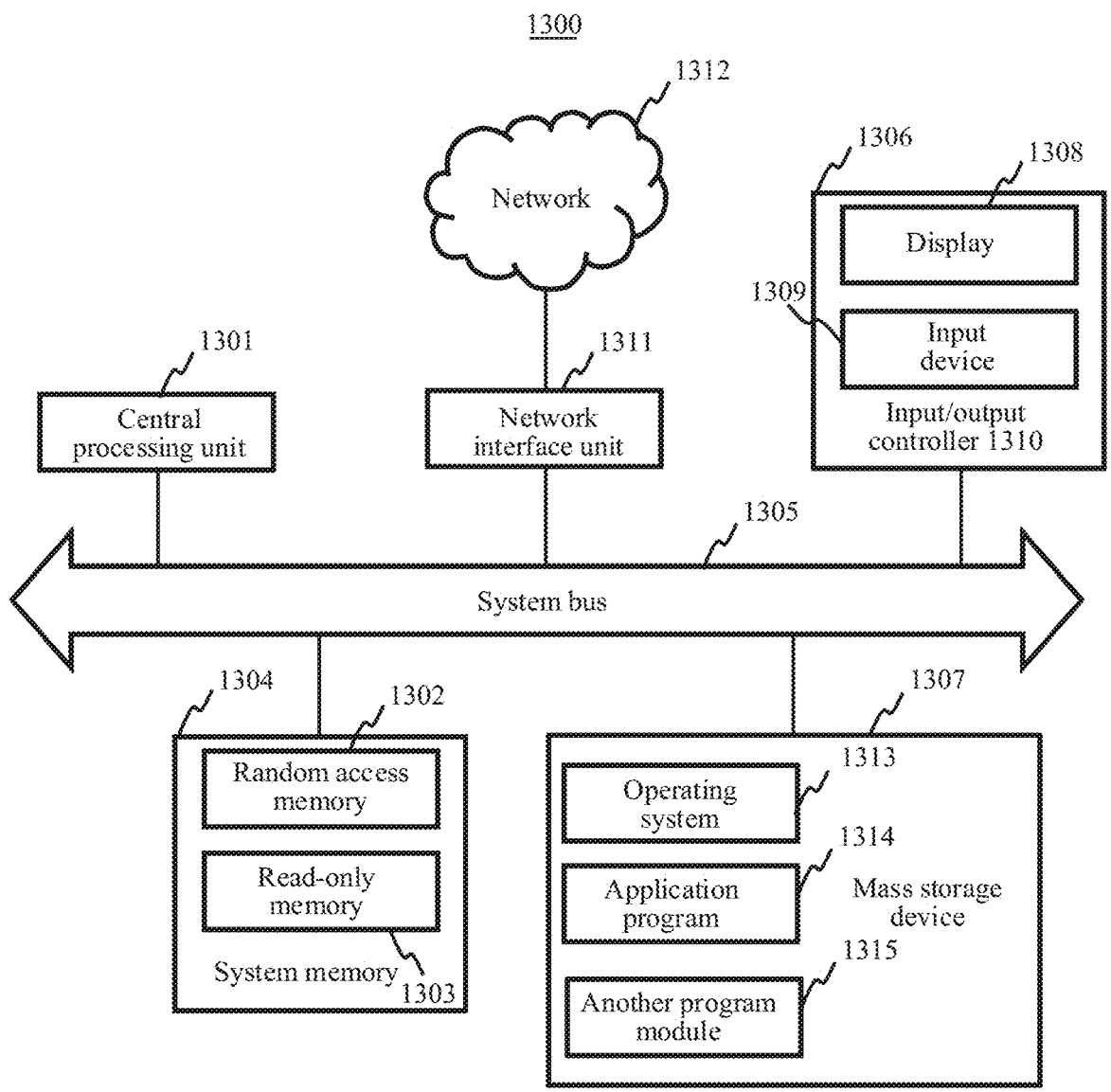
FIG. 15 is a schematic structural diagram of a server according to an embodiment of this application.

FIG. 15 is a schematic structural diagram of a server according to an embodiment of the disclosure. The server is configured to implement the message push method on the server side provided in the foregoing embodiment. Specifically:

The server 1300 includes processing circuitry (e.g., a central processing unit (CPU) 1301), a system memory 1304 including a random access memory (RAM) 1302 and a read-only memory (ROM) 1303, and a system bus 1305 connecting the system memory 1304 and the CPU 1301. The server 1300 further includes a basic input/output system (I/O system) 1306 for transmitting information between components in a computer, and a mass storage device 1307 configured to store an operating system 1313, an application program 1314, and another program module 1315.

The basic I/O system 1306 includes a display 1308 configured to display information, and an input device 1309, such as a mouse or a keyboard, used by a user to input information. The display 1308 and the input device 1309 are both connected to the CPU 1301 by using an input/output controller 1310 connected to the system bus 1305. The basic I/O system 1306 may further include the input/output controller 1310, to receive and process inputs from multiple other devices, such as the keyboard, the mouse, or an electronic stylus. Similarly, the input/output controller 1310 further provides an output to a display screen, a printer or another type of output device.

The mass storage device 1307 is connected to the central processing unit 1301 by using a mass storage controller (not shown) connected to the system bus 1305. The mass storage device 1307 and an associated computer readable medium provide non-volatile storage for the server 1300. That is, the mass storage device 1307 may include a computer readable medium (not shown), such as a hard disk or a CD-ROM drive.

Without loss of generality, the computer readable medium may include a computer storage medium and a communication medium. The computer storage medium includes volatile and non-volatile media, and removable and non-removable media implemented by using any method or technology and configured to store information such as a computer-readable instruction, a data structure, a program module, or other data. The computer storage medium includes a RAM, a ROM, an EPROM, an EEPROM, a flash memory, or other solid-state storage technologies; a CD-ROM, a DVD, or other optical storages; and a cassette, a magnetic tape, a disk storage, or other magnetic storage devices. Certainly, a person skilled in the art would understand that the computer storage medium is not limited to the foregoing types. The system memory 1304 and the mass storage device 1307 may be collectively referred to as a memory.

According to the embodiments of the disclosure, the server 1300 may further be connected, through a network such as the Internet, to a remote computer on the network. That is, the server 1300 may be connected to a network 1312 by using a network interface unit 1311 connected to the system bus 1305, or may be connected to another type of network or a remote computer system by using the network interface unit 1311.

The memory stores at least one instruction, at least one program segment, and a code set or an instruction set; the at least one instruction, the at least one program segment, and the code set or the instruction set is configured to be executed by one or more processors, to implement functions of the steps on the server side in the message push method.

In an exemplary embodiment, a computer-readable storage medium is further provided, the storage medium storing at least one instruction, at least one program segment, and a code set or an instruction set, and the at least one instruction, the at least one program segment, and the code set or the instruction set, when being executed by a processor of the terminal, implementing functions of the steps on the terminal side in the message push method.

In an exemplary embodiment, a computer-readable storage medium is further provided, the storage medium storing at least one instruction, at least one program segment, and a code set or an instruction set, and the at least one instruction, the at least one program segment, and the code set or the instruction set, when being executed by a processor of the server, implementing functions of the steps on the server side in the message push method.

Optionally, the computer-readable storage medium may be a non-transitory computer-readable storage medium such as a ROM, a random access memory (RAM), a CD-ROM, a magnetic tape, a floppy disk, an optical data storage device, or the like.

It is to be understood that "plurality of" mentioned in the specification means two or more. "And/or" describes an association relationship for describing associated objects and represents that three relationships may exist. For example, A and/or B may represent the following three cases: Only A exists, both A and B exist, and only B exists. The character "/" in this specification generally indicates an "or" relationship between the associated objects.

The sequence numbers of the embodiments of the disclosure are merely for the description purpose but do not indicate the preference among the embodiments.

The foregoing descriptions are merely exemplary embodiments of the disclosure, but are not intended to limit the disclosure. Any modification, equivalent replacement, or improvement made within the spirit and principle of the disclosure shall fall within the protection scope of the disclosure.

What is claimed is:

1. A message push method, comprising:
   playing a first video in a play interface of a terminal according to first video data transmitted by a server;
   displaying, by processing circuitry of the terminal, a scenario interaction interface at a preset playback time of the first video, the scenario interaction interface being displayed on a screen of an electronic device shown in the first video;
   obtaining interaction information input based on the displayed scenario interaction interface;
   obtaining a target message related to the obtained interaction information; and
   outputting the obtained target message by the processing circuitry of the terminal.

2. The method according to claim 1, wherein the obtaining the target message comprises:
   transmitting the obtained interaction information to the server; and
   receiving the target message transmitted by the server, the target message being obtained by the server according to the obtained interaction information.

3. The method according to claim 1, further comprising, after the outputting:
   switching from the scenario interaction interface to the play interface; and
   playing a second video in the play interface according to second video data, video content of the second video comprising reward content related to video content of the first video.

4. The method according to claim 3, further comprising, before the playing the second video:
   transmitting a video request to the server, the video request requesting the server to transmit the second video data; and
   receiving the second video data transmitted by the server.

5. The method according to claim 1, wherein
   the scenario interaction interface is an instant messaging interface including instant messaging content; and
   the obtaining the interaction information input based on the scenario interaction interface comprises:
      obtaining text information inputted in the instant messaging interface;
   or
      obtaining audio information captured by the terminal based on the instant messaging interface.

6. The method according to claim 5, wherein the outputting comprises:
   displaying a text message of the target message in the instant messaging interface, the text message of the target message being generated by an artificial intelligence model, and the artificial intelligence model being obtained by training a neural network model by using at least one of a preset text sample or a preset audio sample;
   or
   playing an audio message of the target message based on the instant messaging interface, the audio message of the target message being generated by an artificial intelligence model, and the artificial intelligence model being obtained by training a neural network model by using at least one of a preset text sample or a preset audio sample.

7. The method according to claim 1, wherein the scenario interaction interface is a call interface including call content; and
the obtaining the interaction information input based on the scenario interaction interface comprises:
obtaining a trigger signal on an answer control in the call interface;
or
obtaining audio information captured by the terminal based on the call interface.

8. The method according to claim 7, wherein the outputting comprises:
playing an audio message of the target message based on the call interface, the audio message of the target message being a preset audio message, or the audio message of the target message being generated by an artificial intelligence model, and the artificial intelligence model being obtained by training a neural network model by using at least one of a preset text sample or a preset audio sample.

9. The method according to claim 1, wherein the scenario interaction interface is a game demo interface including game content; and
the method further comprises:
obtaining an operation signal in the game demo interface; and
playing a third video in the game demo interface according to the operation signal, the third video being a video set according to the game content.

10. The method according to claim 1, wherein the scenario interaction interface is a game interface including game content; and
the method further comprises:
obtaining a control instruction in the game interface; and
performing a corresponding game operation in the game interface according to the control instruction.

11. The method according to claim 1, further comprising, before the displaying the scenario interaction interface:
displaying a prompt interface together with the play interface at the preset playback time of the first video, the prompt interface requesting to switch to the scenario interaction interface; and
displaying the scenario interaction interface in a case that a switching signal is obtained through the prompt interface.

12. The method according to claim 8, wherein the audio message of the target message corresponds to a character shown in the first video.

13. A message push terminal comprising:
processing circuitry configured to
play a first video in a play interface according to first video data transmitted by a server;
display a scenario interaction interface at a preset playback time of the first video, the scenario interaction interface being displayed on a screen of an electronic device shown in the first video;
obtain interaction information input based on the displayed scenario interaction interface;
obtain a target message related to the obtained interaction information; and
output the obtained target message.

14. The message push terminal according to claim 13, wherein, to obtain the target message, the processing circuitry is configured to:
transmit the obtained interaction information to the server; and
receive the target message transmitted by the server, the target message being obtained by the server according to the obtained interaction information.

15. The message push terminal according to claim 13, wherein the processing circuitry is further configured to, after the outputting:
switch from the scenario interaction interface to the play interface; and
play a second video in the play interface according to second video data, video content of the second video comprising reward content related to video content of the first video.

16. The message push terminal according to claim 15, wherein the processing circuitry is further configured to, before the playing the second video:
transmit a video request to the server, the video request requesting the server to transmit the second video data; and
receive the second video data transmitted by the server.

17. The message push terminal according to claim 13, wherein
the scenario interaction interface is an instant messaging interface including instant messaging content; and
to obtain the interaction information input based on the scenario interaction interface, the processing circuitry is configured to
obtain text information inputted in the instant messaging interface;
or
obtain audio information captured by the message push terminal based on the instant messaging interface.

18. The message push terminal according to claim 17, wherein, to perform the outputting, the processing circuitry is configured to:
display a text message of the target message in the instant messaging interface, the text message of the target message being generated by an artificial intelligence model, and the artificial intelligence model being obtained by training a neural network model by using at least one of a preset text sample or a preset audio sample;
or
play an audio message of the target message based on the instant messaging interface, the audio message of the target message being generated by an artificial intelligence model, and the artificial intelligence model being obtained by training a neural network model by using at least one of a preset text sample or a preset audio sample.

19. The message push terminal according to claim 13, wherein the scenario interaction interface is a call interface including call content; and
to obtain the interaction information input based on the scenario interaction interface, the processing circuitry is configured to
obtain a trigger signal on an answer control in the call interface;
or
obtain audio information captured by the message push terminal based on the call interface.

20. A non-transitory computer-readable storage medium, storing instructions, which, when executed by at least one processor of a terminal, cause the terminal to perform a message push method, comprising:
- playing a first video in a play interface of the terminal according to first video data transmitted by a server;
- displaying a scenario interaction interface at a preset playback time of the first video, the scenario interaction interface being displayed on a screen of an electronic device shown in the first video;
- obtaining interaction information input based on the displayed scenario interaction interface;
- obtaining a target message related to the obtained interaction information; and
- outputting the obtained target message by the processing circuitry of the terminal.

* * * * *